(12) United States Patent
Staab et al.

(10) Patent No.: US 7,396,084 B2
(45) Date of Patent: Jul. 8, 2008

(54) AIRCRAFT SEAT FIXING APPARATUS

(75) Inventors: Franz Staab, Salem (DE); Helmut Mai, Düsseldorf (DE)

(73) Assignee: RECARO Aircraft Seating GmbH & Co. KG, Schwäbish Hall (DE)

( * ) Notice: Subject to any disclaimer, the term of this patent is extended or adjusted under 35 U.S.C. 154(b) by 0 days.

(21) Appl. No.: 11/707,957

(22) Filed: Feb. 20, 2007

(65) Prior Publication Data

US 2007/0197098 A1    Aug. 23, 2007

(30) Foreign Application Priority Data

Feb. 21, 2006   (DE) .................. 10 2006 007 977

(51) Int. Cl.
  *A47C 31/00*   (2006.01)
  *B60N 2/68*   (2006.01)
  *B64D 11/06*   (2006.01)
(52) U.S. Cl. ................... 297/463.1; 248/429
(58) Field of Classification Search ............. 297/463.1, 297/440.22; 248/423, 424, 429
  See application file for complete search history.

(56) References Cited

U.S. PATENT DOCUMENTS

| | | | | |
|---|---|---|---|---|
| 3,915,493 A | * | 10/1975 | Brown | 296/63 |
| 4,588,225 A | * | 5/1986 | Sakamoto | 297/344.14 |
| 4,805,952 A | * | 2/1989 | Coleman | 296/65.03 |
| 5,083,738 A | * | 1/1992 | Infanti | 248/500 |
| 5,547,242 A | * | 8/1996 | Dukatz et al. | 296/65.03 |
| 5,573,301 A | * | 11/1996 | Scott | 297/173 |
| 5,584,535 A | * | 12/1996 | Jacobson et al. | 297/423.46 |
| 5,904,407 A | | 5/1999 | Larson et al. | |
| 6,572,187 B2 | * | 6/2003 | Laufer | 297/217.1 |

FOREIGN PATENT DOCUMENTS

| WO | WO 97/19727 A1 | 6/1997 |
|---|---|---|
| WO | WO 2006/059118 A1 | 6/2006 |

* cited by examiner

*Primary Examiner*—Joseph F Edell
(74) *Attorney, Agent, or Firm*—Posz Law Group, PLC

(57) ABSTRACT

An aircraft seat fixing apparatus includes at least one insertion region and at least one retaining element, both of which are provided for fixing a shell half to a bracket. The insertion region comprises a recess for enabling the retaining element to be inserted into the insertion region by means of an insertion movement which has a component perpendicular to a main direction of the extent of the retaining element.

13 Claims, 5 Drawing Sheets

AIRCRAFT SEAT FIXING APPARATUS

CROSS REFERENCE TO RELATED APPLICATION

This application is related to, claims priority from, and incorporates by reference German Patent Application No. DE 10 2006 007 977.9, filed on Feb. 21, 2006.

FIELD OF THE INVENTION

The invention is related generally to an aircraft seat fixing apparatus, and more specifically to an aircraft seat fixing apparatus with at least one insertion region and at least one retaining element, both of which are provided for fixing a shell half to a bracket.

BACKGROUND OF THE INVENTION

Aircraft seat fixing apparatuses which are provided for fixing a shell half to a bracket are already known. A plate which is provided with holes is generally attached to the bracket. Installation requires multiple steps and is time intensive, as pins must be glued into the shell halves and inserted into the holes in order to fix the shell half to the bracket.

Therefore, there is a need for an aircraft seat fixing apparatus that permits simple and rapid installation.

SUMMARY OF THE INVENTION

In view of the above, an aircraft seat fixing apparatus is provided with at least one insertion region and at least one retaining element for fixing a shell half to a bracket.

The insertion region comprises a recess which is provided for the purpose of enabling the retaining element to be inserted into the insertion region by means of an insertion movement which has a component perpendicular to a main direction of extent of the retaining element. In this case, a main direction of extent of the retaining element is to be understood as meaning, in particular, the length of the retaining element, which is preferably designed as a projection, such as, for example, a pin or bolt. By this means, a structurally simple and time-saving installation of the shell half on the bracket can be achieved, and a skewed insertion of the shell half into the bracket and/or a subsequent screwing of the shell half to the bracket can be avoided. The insertion region with the recess or the retaining element may be arranged either on the shell half or on the bracket.

However, it is particularly advantageous if the shell half comprises the insertion region with the recess, and the bracket comprises the retaining element, it thereby being possible to keep the recesses on the insertion regions of the shell half as small as possible. Consequently a particularly space-saving construction of the aircraft seat fixing apparatus can be achieved.

Furthermore, it is proposed that the recess is formed by an elongated slot with main directions of extent in at least two different dimensions, as a result of which a particularly simple and rapid insertion of the retaining element into the recess of the insertion region can be achieved, and an advantageously interlocking securing of the retaining element in at least one of the dimensions can be obtained in a simple manner, to be precise, preferably in the manner of a bayonet-type fastening. This can be achieved in a particularly advantageous manner if the elongated slot is provided with main directions of extent in three different dimensions and the insertion of the shell half can therefore be implemented in a particularly space-saving manner. In this case, a "main direction of extent" is to be understood in particular as meaning a longitudinal direction of the elongated hole.

Furthermore, it is advantageous if the insertion region with the recess is formed by a tab-like subregion protruding over the shell half. In this connection, a particularly exact and simple installation of the shell half on the bracket, in particular in regions with little installation space, can be achieved, and, in addition, an increased stability of the insertion regions can be achieved by means of the tab-like subregion. In a particularly advantageous manner, this can be achieved by an upwardly protruding, tab-like subregion. In this connection, "upward" is to be understood as meaning the direction which is directed counter to the weight during the normal operating position of an aircraft.

In a further refinement, it is proposed that at least one insertion region has a guide element, thus making it possible to simplify the insertion of the retaining element into the insertion region, in particular in the case of a retaining element which is concealed to a fitter by the shell half during the installation thereof. In this connection, a "guide element" is to be understood as meaning an element which facilitates the insertion, in particular the insertion of a retaining element, into an insertion region on account of movement restrictions, in particular by guiding it along a predetermined guide path. The guide element is particularly advantageously formed by an upwardly tapering recess with which the insertion region can be enlarged for the retaining element in the lower region of the upwardly tapering recess. In principle, however, other guide elements appearing expedient to a person skilled in the art are also conceivable.

The aircraft seat fixing apparatus advantageously comprises at least one latching element for the latching of the retaining element, thus making it possible to achieve a particularly stable connection and securing between retaining element and latching element. The latching element is particularly advantageously arranged within the elongated hole, in particular is formed integrally with the edge of the elongated hole, thus enabling further components, construction space, outlay on installation and costs to be saved. The shell half can thereby be attached to the bracket in a particularly stable and secure manner. An undesired, automatic release of the shell half due to vibrations and further movements of the bracket and/or of the shell half can be avoided by the latching of the retaining element. As an alternative and/or in addition to this, a securing can also be achieved cost-effectively via further components which are already present, by, for example, the insertion region of the shell half being able to be secured on the console via a rotatable retaining element formed by a retaining pin.

Furthermore, it is advantageous if the aircraft seat fixing apparatus comprises a recess which is provided for the purpose of enabling the retaining element to be secured in the recess by means of a weight acting on the shell half, thus making it possible to achieve a particularly simple and cost-effective securing of the shell half on the bracket.

In a further refinement, it is proposed that at least one strip which comprises a recess is attached to the shell half, thus making it possible to achieve a structurally simple reinforcement and associated stability of that edge region of the shell half which comprises the insertion region. In this case, the strip can be connected to the shell half by welding, riveting and/or in a further manner appearing expedient to a person skilled in the art. In addition, the strip can also be formed as a single piece with the shell half, for example by said strip being integrally formed on the shell half by means of a punching and bending process.

The strip advantageously comprises at least two recesses, and the bracket comprises at least two retaining elements, as a result of which, above all, a stable orientation of the shell half on the bracket and a load-bearing unit between the shell half and the bracket can be achieved.

Furthermore, it is proposed that the at least one insertion region is of multi-layered design, thus enabling the stability of the insertion region and therefore also the retaining function thereof to be increased. In this case, both the strip and the shell half can be of multi-layered design in the insertion region and/or the strip and the shell half together can form a multi-layered insertion region.

BRIEF DESCRIPTION OF THE DRAWINGS

Further advantages emerge from the description below of the drawings. The drawings illustrate an exemplary embodiment of the invention. The drawings, the description and the claims contain numerous features in combination. A person skilled in the art will also expediently consider the features individually and put them together to form meaningful further combinations.

DETAILED DESCRIPTION OF THE EXEMPLARY EMBODIMENTS

Figure 3:
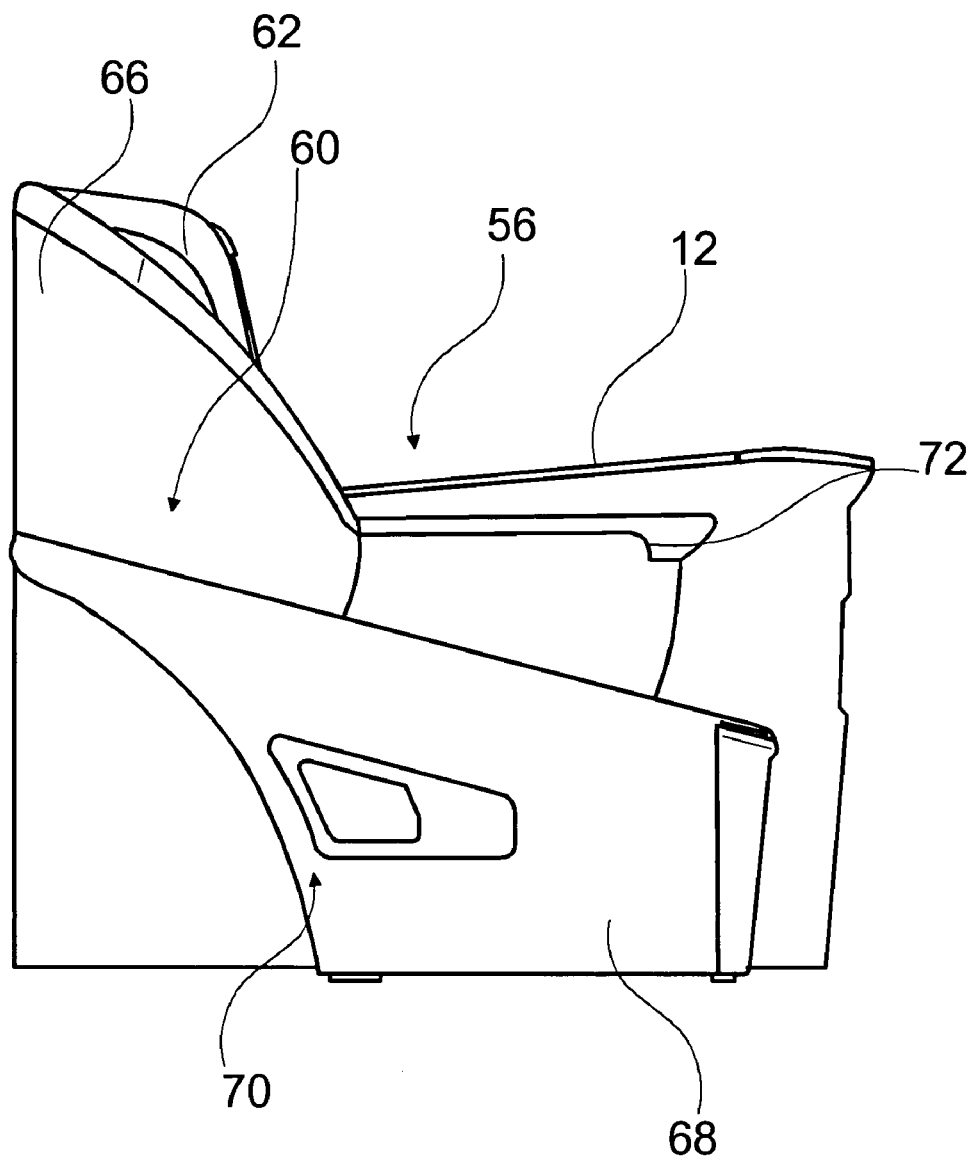
FIG. 3 shows a schematically illustrated aircraft seat in a side view.
Figure 4:
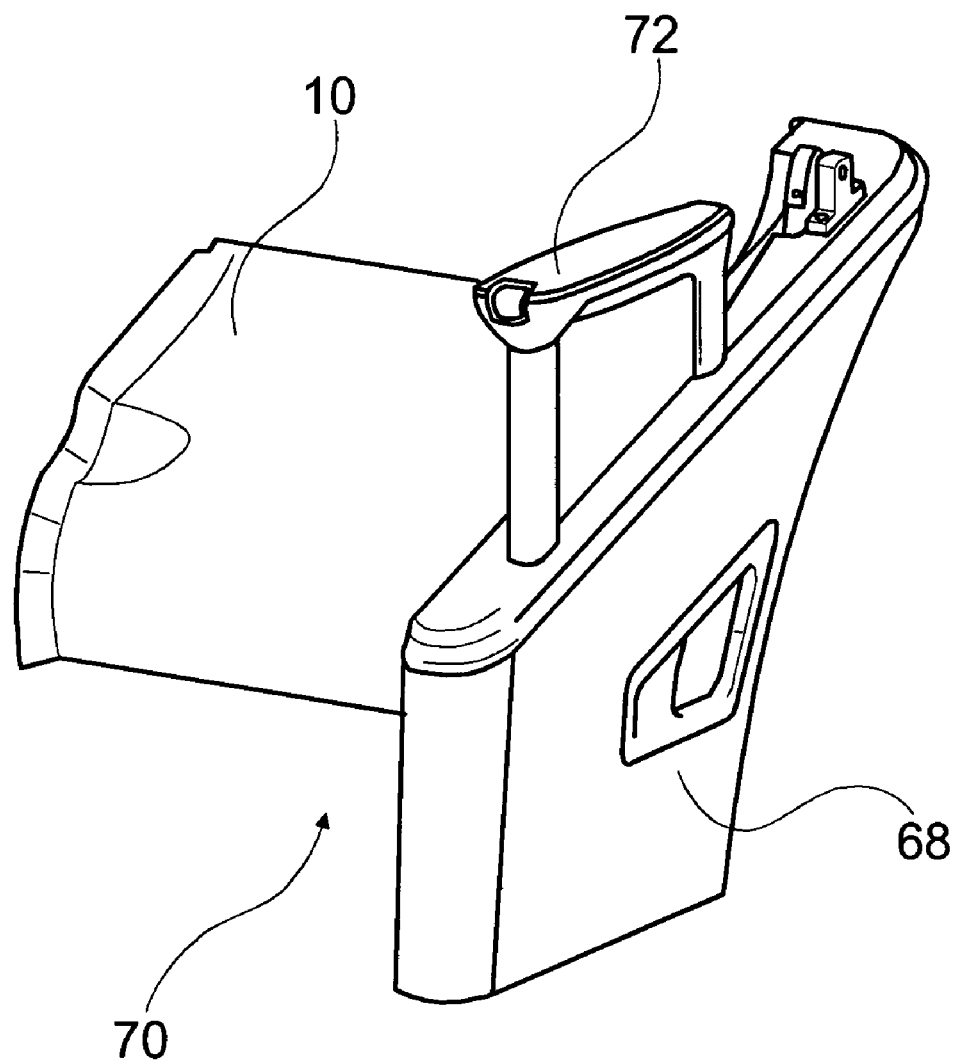
FIG. 4 shows a schematic partial section of an aircraft seat from FIG. 3 with an apparatus according to another preferred embodiment.
Figure 5:
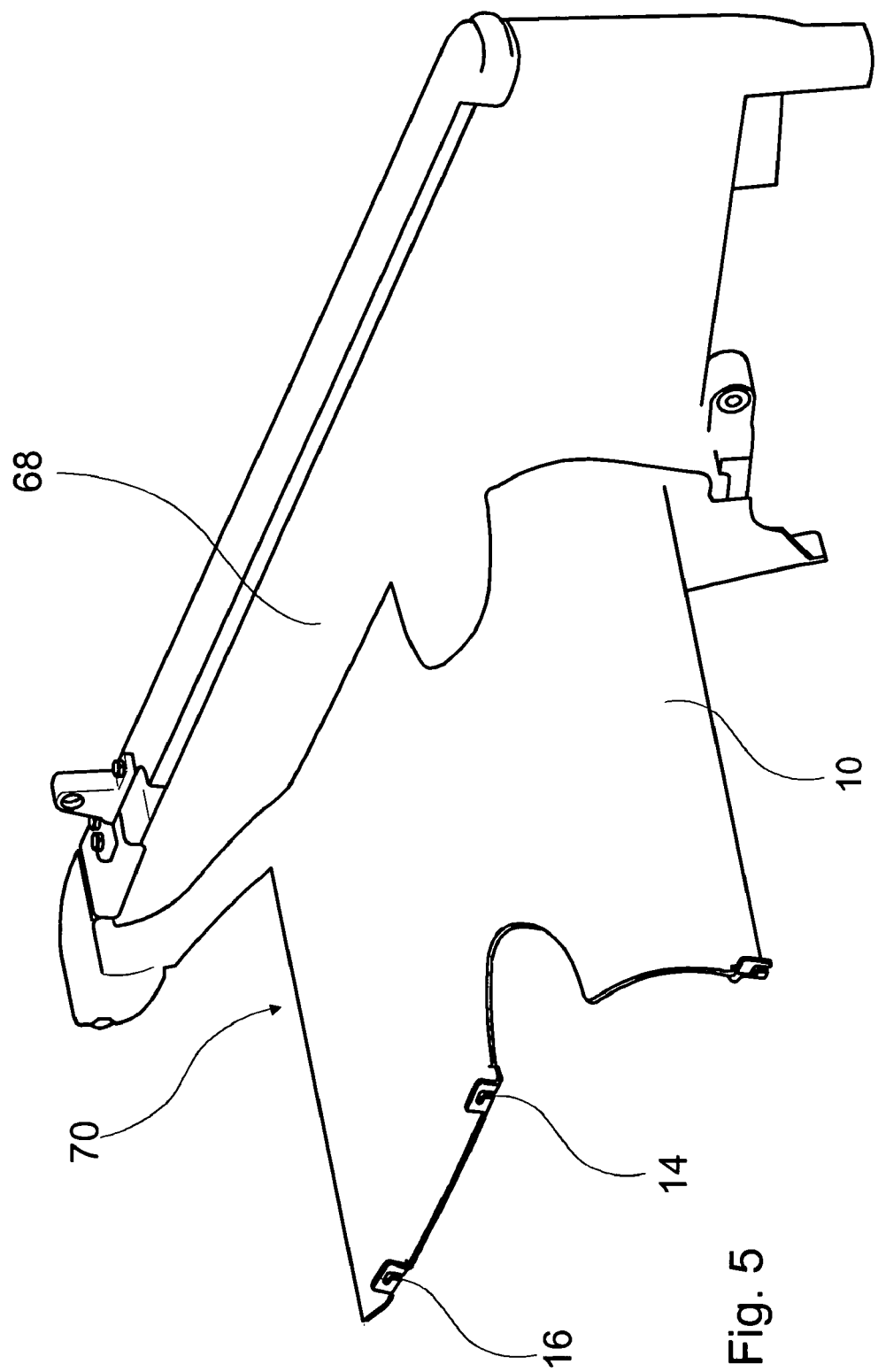
FIG. 5 shows a schematic partial section of an aircraft seat from FIG. 3 with an apparatus according to another preferred embodiment.

FIGS. 3 and 4 illustrate an aircraft seat apparatus 56 with an aircraft seat housing 60 which comprises lower shell halves 10 and upper shell halves 66. A shell unit 70 arranged within the aircraft seat apparatus 56 comprises the lower shell half 10 together with a side part 68 to which an arm rest 72 is attached (FIGS. 4 and 5). A bracket 12 is arranged centrally in the aircraft seat apparatus 56, perpendicular to an aircraft floor surface (not illustrated specifically here), and therefore a lower shell half 10 can be attached from both sides to the bracket 12. The bracket 12, the upper shell halves 66 and the shell units 70 of the aircraft seat apparatus 56 form a fixed retaining shell, in which two adjustable aircraft seats 62 are arranged (FIG. 3). The shell half 10 here has the function of shielding a mechanism of the aircraft seat apparatus 56 in order to protect an aircraft passenger sitting behind the aircraft seat apparatus 56 from the same (FIGS. 4 and 5).

Figure 1:
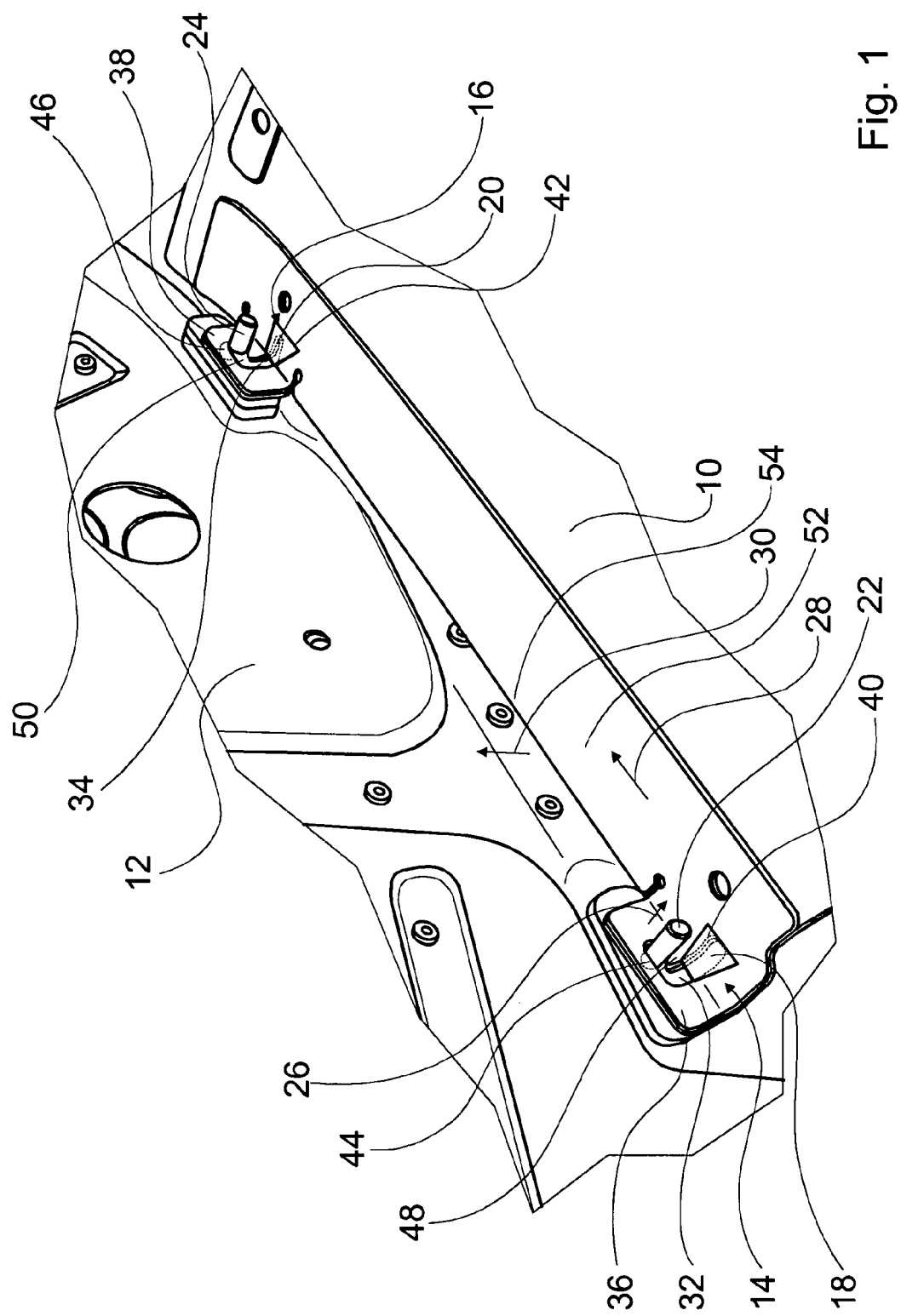
FIG. 1 shows a partial section of an aircraft seat with an apparatus according to a preferred embodiment in a schematic illustration.

FIG. 1 illustrates an aircraft seat fixing apparatus which comprises the lower shell half 10 and the bracket 12. In order to fix the lower shell half 10 to the bracket 12, the bracket 12 is provided with two bolt-like retaining elements 22, 24 which are riveted to said bracket. The lower shell half 10 is provided, at an edge region 54 facing the bracket 12, with a strip 52 which is welded to the latter. The strip 52 essentially has a rectangular shape and serves to reinforce the edge region 54 of the lower shell half 10.

Figure 2:
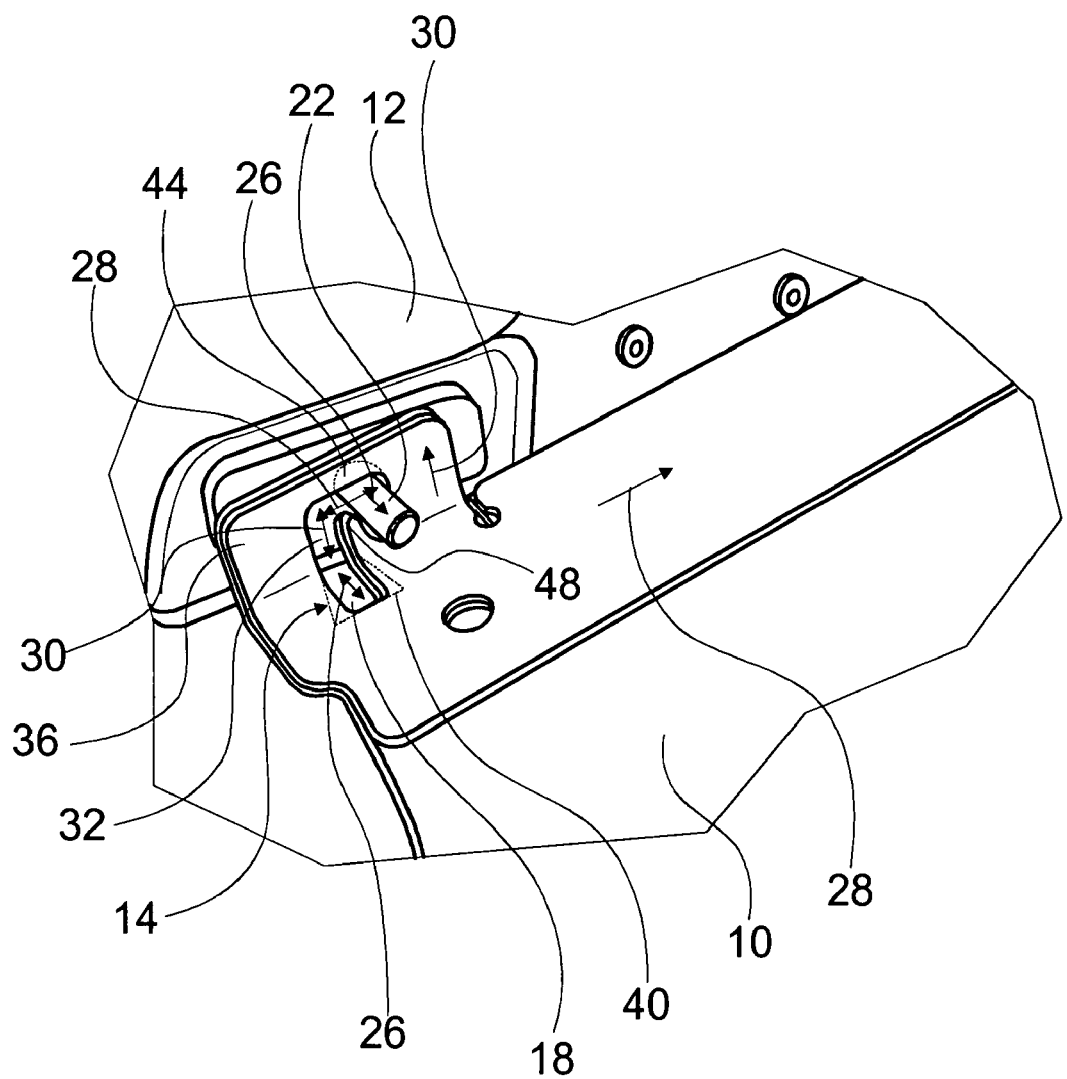
FIG. 2 shows a partial section of the apparatus illustrated in FIG. 1.

The edge region 54 of the lower shell half 10 and of the strip 52 is provided with two insertion regions 14, 16. For additional stability of the lower shell half 10, the edge region 54 and the insertion regions 14, 16 are formed in two layers by means of the strip 52 and the lower shell half 10 (FIGS. 1 and 2). The insertion regions 14, 16 each comprise a tab-like subregion 36, 38, which projects over an extent of the lower shell half 10. In FIGS. 1 and 2, these subregions 36, 38 have an upwardly directed main direction of extent 28 which is perpendicular to the extent of the lower shell half 10. The insertion regions 14, 16 are respectively provided with a recess 18, 20. The recesses 18, 20 are respectively formed by a three-dimensional elongated hole 32, 34. The elongated holes 32, 34 of the insertion regions 14, 16 have a main direction of extent 26 in a plane which is spanned by the lower shell half 10 and is perpendicular to a main direction of extent 28 of the strip 52. In addition, the elongated holes 32, 34 have two further main directions of extent 28, 30 within the subregions 36, 38, which are oriented upwards, perpendicular to the lower shell half 10, the main directions of extent 28, 30 of the elongated holes 32, 34 being formed perpendicular and parallel to the main direction of extent 28 of the strip 52.

During the installation on the bracket 12, the lower shell half 10 with the upwardly oriented subregions 36, 38 is brought up to the bracket 12 from above, as a result of which the retaining elements 22, 24 are inserted perpendicular to their main direction of extent 26 into the elongated holes 32, 34. In order to simplify the insertion of the retaining elements 22, 24 into the elongated holes 32, 34, the aircraft seat fixing apparatus is provided, at the insertion regions 14, 16, with a respective guide element 40, 42, such that, even when view of the retaining elements 22, 24 is concealed, simple insertion is made possible. The guide elements 40, 42 are formed in the region of the elongated holes 32, 34 by upwardly tapering recesses (FIGS. 1 and 2).

In order to secure the lower shell half 100 on the bracket 12, the recesses 18, 20 formed by elongated holes 32, 34 have latching elements 48, 50. The latching elements 48, 50 are formed by a constricted recess within the elongated holes 32, 34, with the regions of the elongated holes 32, 34 in front of and behind the latching elements 48, 50 being matched to a cross-sectional area of the retaining elements 22, 24, enabling a virtually friction-free guidance of the retaining elements 22, 24. In the region of the latching elements 48, 50, the elongated holes 32, 34 have, perpendicular to their main direction of extent 28, an extent which is smaller than a diameter of the retaining elements 22, 24, and therefore the retaining elements 22, 24 are only able to pass through the constricted recesses by application of external forces, for example by force being applied by a person skilled in the art during the installation of the lower shell half 10, and, as a result, the lower shell half 10 is secured on the bracket 12. As an alternative and/or in addition to latching elements 48, 50 located in the elongated holes 32, 34, the elongated holes 32, 34 may also be respectively provided with a further recess 44, 46 permitting the lower shell half 10 to be secured on the bracket 12 with the use of a weight acting on the lower shell half 10. These recesses 44, 46 likewise extend upwards because of the upwardly directed subregions 36, 38 of the insertion regions 14, 16, and are illustrated by dashed lines in FIGS. 1 and 2. The upwardly directed recesses 44, 46 are opposed to the weight acting on the lower shell half 10, as a result of which their edges prevent release of the retaining elements 22, 24 within the insertion regions 14, 16 of the lower shell half 10.

The invention claimed is:

1. An aircraft seat fixing apparatus, comprising:
   at least one insertion region of multi-layered design; and
   at least one retaining element provided in the insertion region for fixing a shell half to a bracket, wherein
   the insertion region comprises a tabbed subregion protruding from the shell half with a recess, the recess includes an elongated hole with main directions of extent in at least two different dimensions, the elongated hole has a component perpendicular to and at least extending in a main direction of extent of the retaining element, and
   at least one strip which includes the recess is attached to the shell half and the insertion region is formed in two layers including the strip and the shell half.

2. The aircraft seat fixing apparatus according to claim 1, wherein the shell half comprises the insertion region with the recess, and the bracket comprises the retaining element.

3. The aircraft seat fixing apparatus according to claim 1, wherein the tabbed subregion protrudes upwardly.

4. The aircraft seat fixing apparatus according to claim 1, wherein the insertion region has a guide element.

5. The aircraft seat fixing apparatus according to claim 4, wherein the guide element is formed by an upwardly tapering recess.

6. The aircraft seat fixing apparatus according to claim 1, further comprising at least one latching element for latching of the retaining element.

7. The aircraft seat apparatus according to claim 6, wherein the latching element is arranged within the elongated hole.

8. The aircraft seat apparatus according to claim 7, wherein the latching element is formed integrally with an edge of the elongated hole.

9. The aircraft seat apparatus according to claim 7, wherein the latching element is formed by a constricted recess within the elongated hole.

10. The aircraft seat fixing apparatus according to claim 1, further comprising another recess securing the retaining element therein by a weight acting on the shell half.

11. The aircraft seat fixing apparatus according to claim 1, wherein the at least one strip comprises at least two recesses, and the bracket comprises at least two retaining elements.

12. The aircraft seat apparatus according to claim 1, wherein the recess is formed by a three-dimensional elongated hole.

13. The aircraft seat apparatus according to claim 1, wherein the two main directions of extent of the elongated hole are respectively formed perpendicularly and parallel to the main direction of extent of the strip.

* * * * *